(12) United States Patent
Smith et al.

(10) Patent No.: US 7,200,407 B1
(45) Date of Patent: Apr. 3, 2007

(54) MULTIPLE REUSE PATTERNS FOR CHANNELS OF WIRELESS NETWORKS

(75) Inventors: Martin Smith, Chelmsford (GB); Keith S Wilson, Bishops Stortford (GB); Julius Robson, Dunmow (GB); Mark Watkins, Great Dunmow (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 419 days.

(21) Appl. No.: 10/360,485

(22) Filed: Feb. 6, 2003

(51) Int. Cl.
*H04Q 7/20* (2006.01)

(52) U.S. Cl. .................. 455/452.2; 455/447; 455/450

(58) Field of Classification Search ............. 455/452.2, 455/447, 452.1
See application file for complete search history.

(56) References Cited

U.S. PATENT DOCUMENTS

| | | | | |
|---|---|---|---|---|
| 5,465,390 A | * | 11/1995 | Cohen .......................... | 455/446 |
| 5,485,631 A | * | 1/1996 | Bruckert ...................... | 455/446 |
| 5,946,625 A | * | 8/1999 | Hassan et al. ............... | 455/447 |
| 5,974,323 A | * | 10/1999 | Doner .......................... | 455/447 |
| 6,023,622 A | * | 2/2000 | Plaschke et al. ........... | 455/452.2 |
| 6,038,455 A | * | 3/2000 | Gardner et al. ............. | 455/447 |
| 6,069,885 A | * | 5/2000 | Fong et al. .................. | 370/336 |
| 6,088,416 A | * | 7/2000 | Perahia et al. ............... | 455/447 |
| 6,229,796 B1 | * | 5/2001 | Dent ........................... | 370/335 |
| 6,262,980 B1 | * | 7/2001 | Leung et al. ................ | 370/336 |
| 6,497,599 B1 | * | 12/2002 | Johnson et al. .............. | 455/447 |
| 6,512,752 B1 | * | 1/2003 | H'mimy et al. ............. | 455/450 |
| 6,782,263 B1 | * | 8/2004 | Peltola et al. ............. | 455/452.1 |
| 6,965,582 B1 | * | 11/2005 | Moulsley ..................... | 370/329 |
| 2002/0034158 A1 | * | 3/2002 | Wang et al. ................. | 455/447 |
| 2002/0128014 A1 | * | 9/2002 | Chen ........................... | 455/447 |
| 2002/0145988 A1 | * | 10/2002 | Dahlman et al. ............ | 455/447 |
| 2002/0164989 A1 | * | 11/2002 | Skillermark et al. ........ | 455/446 |
| 2003/0013451 A1 | * | 1/2003 | Walton ........................ | 455/447 |
| 2004/0102189 A1 | * | 5/2004 | Shurvinton et al. ....... | 455/422.1 |

* cited by examiner

*Primary Examiner*—Lester G. Kincaid
*Assistant Examiner*—Marivelisse Santiago-Cordero
(74) *Attorney, Agent, or Firm*—Barnes & Thornburg

(57) ABSTRACT

A base station for a wireless network has multiple channels for communicating with user equipments, and has multiple channel reuse patterns. The patterns are complementary such that areas of low carrier to interference ratio C/I of one pattern are not coincident with areas of low C/I of other patterns. An allocator allocates channels such that for user equipment located in an area of low C/I of any of the complementary patterns, the allocator favors allocation of a channel of another of the complementary patterns. The sacrifice of capacity can be reduced as there is less need for a capacity-hungry high re-use factor pattern. The channels may be frequencies, time slots or CDMA codes. The reuse patterns can involve reuse on selected base stations, or on selected sectors, or different polarizations. The network can be of any type including fixed wireless access FWA, or mobile networks.

17 Claims, 13 Drawing Sheets

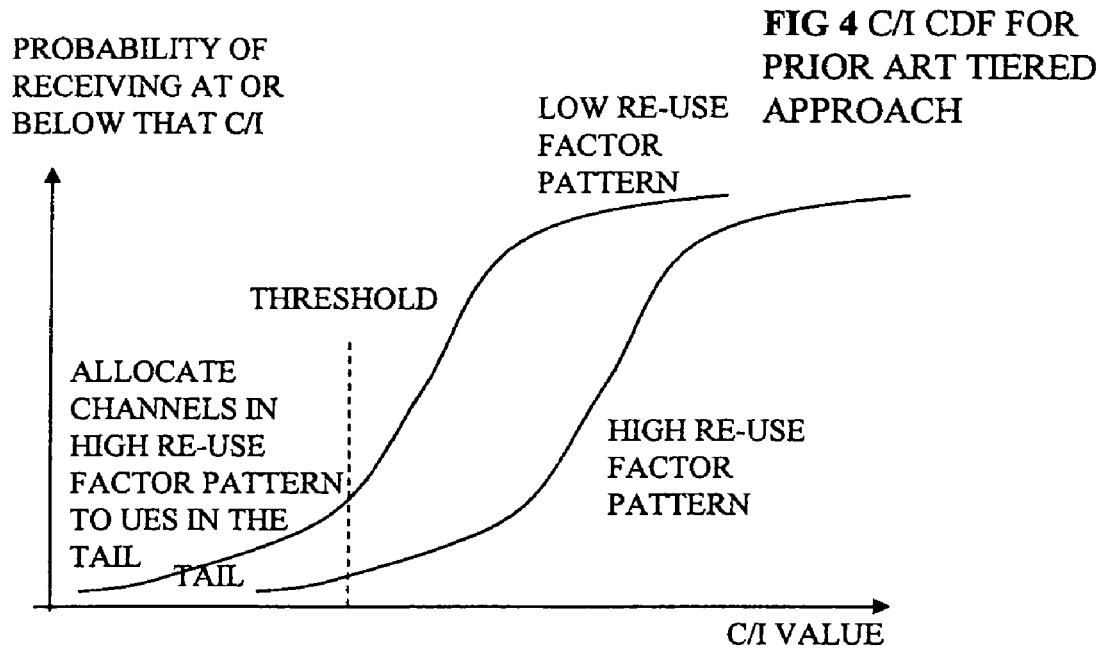
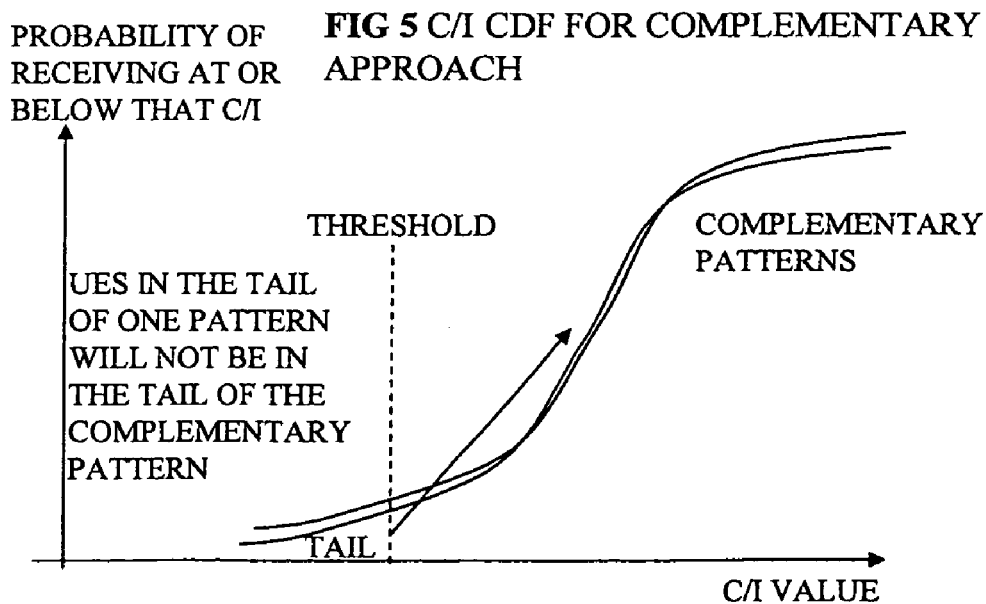

FIG 6 Tri layer reuse pattern
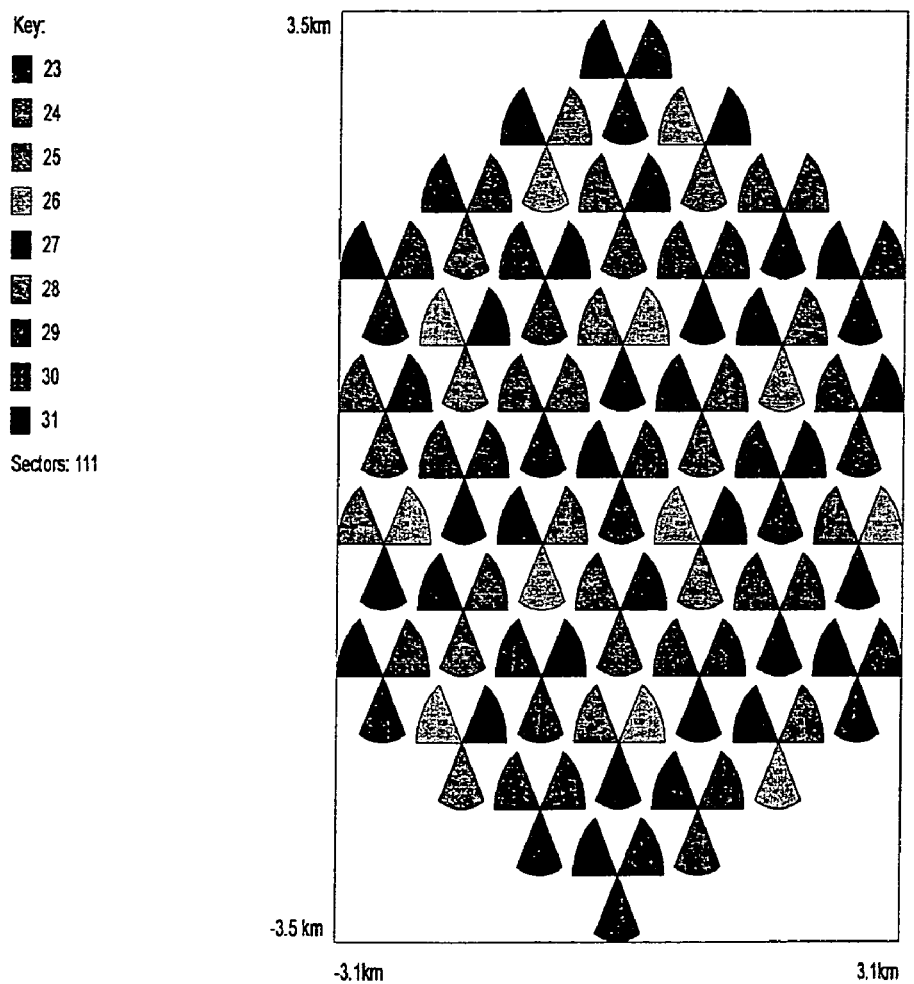

FIG 7 tri layer outages
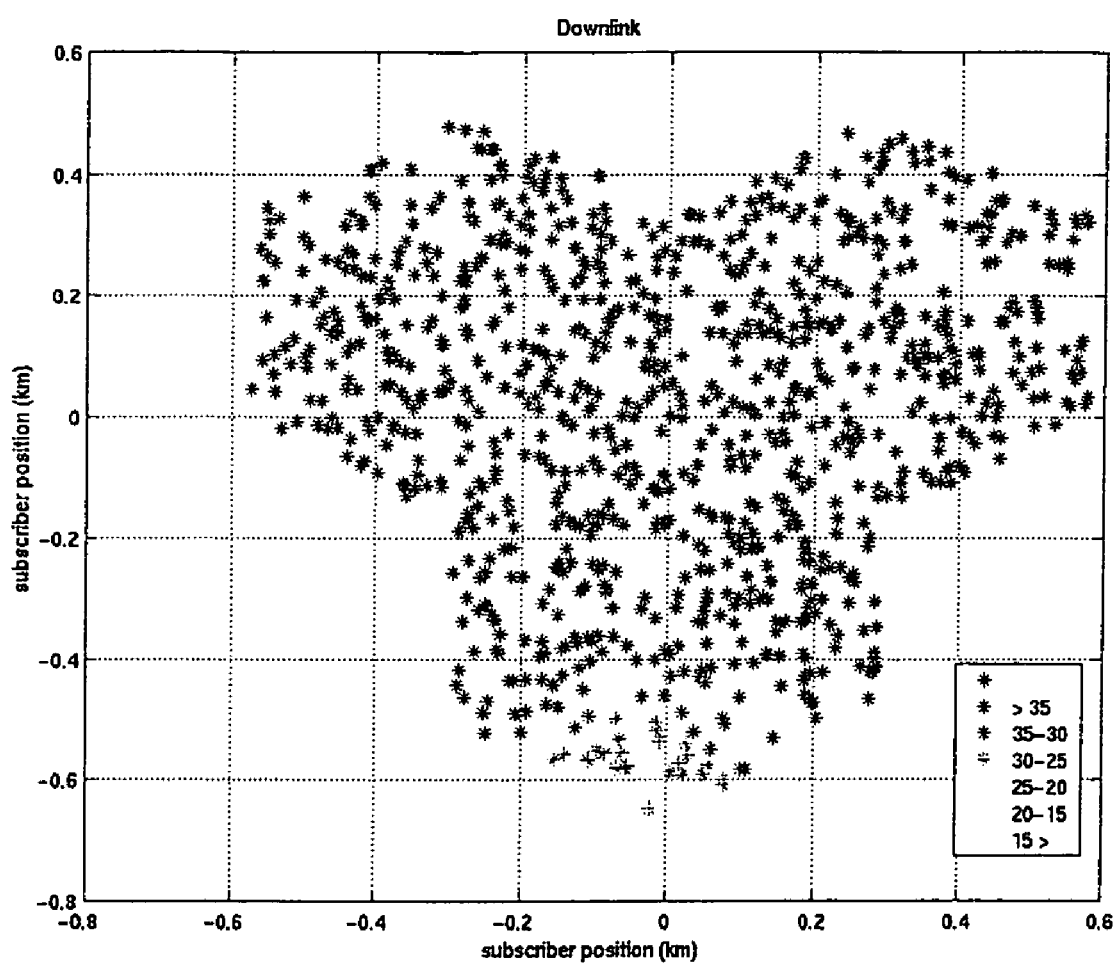

FIG 8 first hex pattern
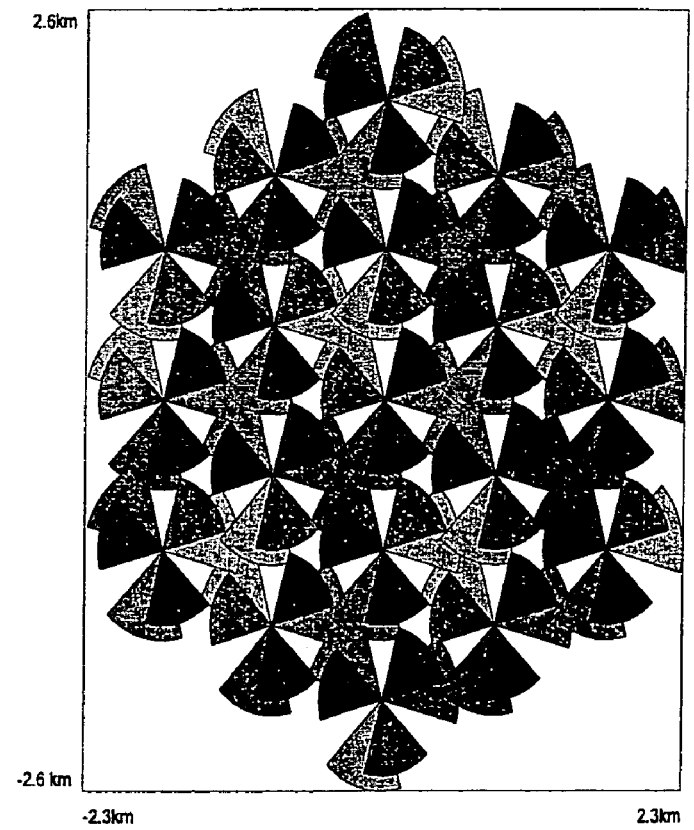
Key:
- ■ 9
- ▦ 10
- ▩ 11
- ▨ 12
- ■ 13
- ▩ 14
Sectors: 114

FIG 9   first hex outages
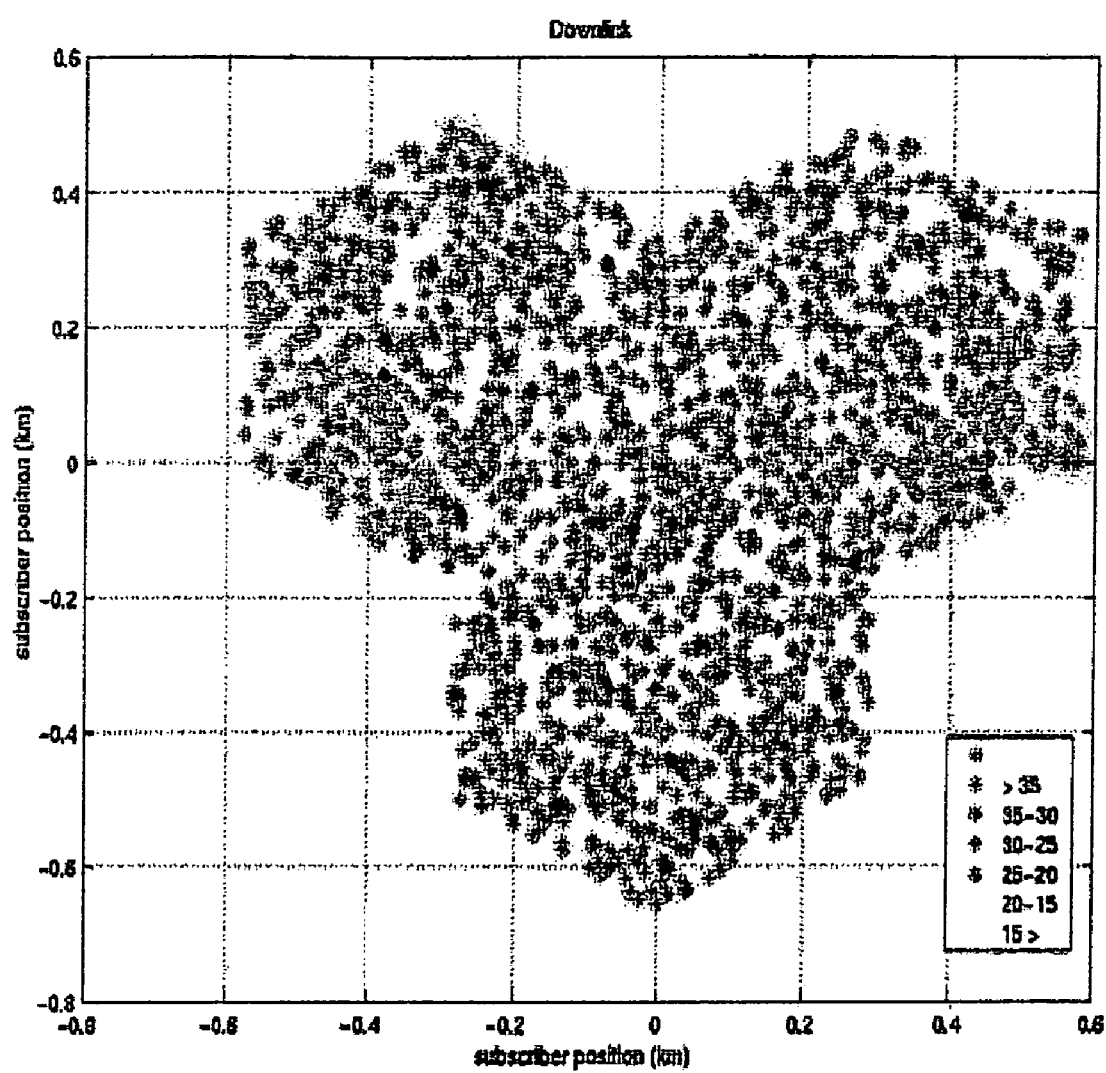

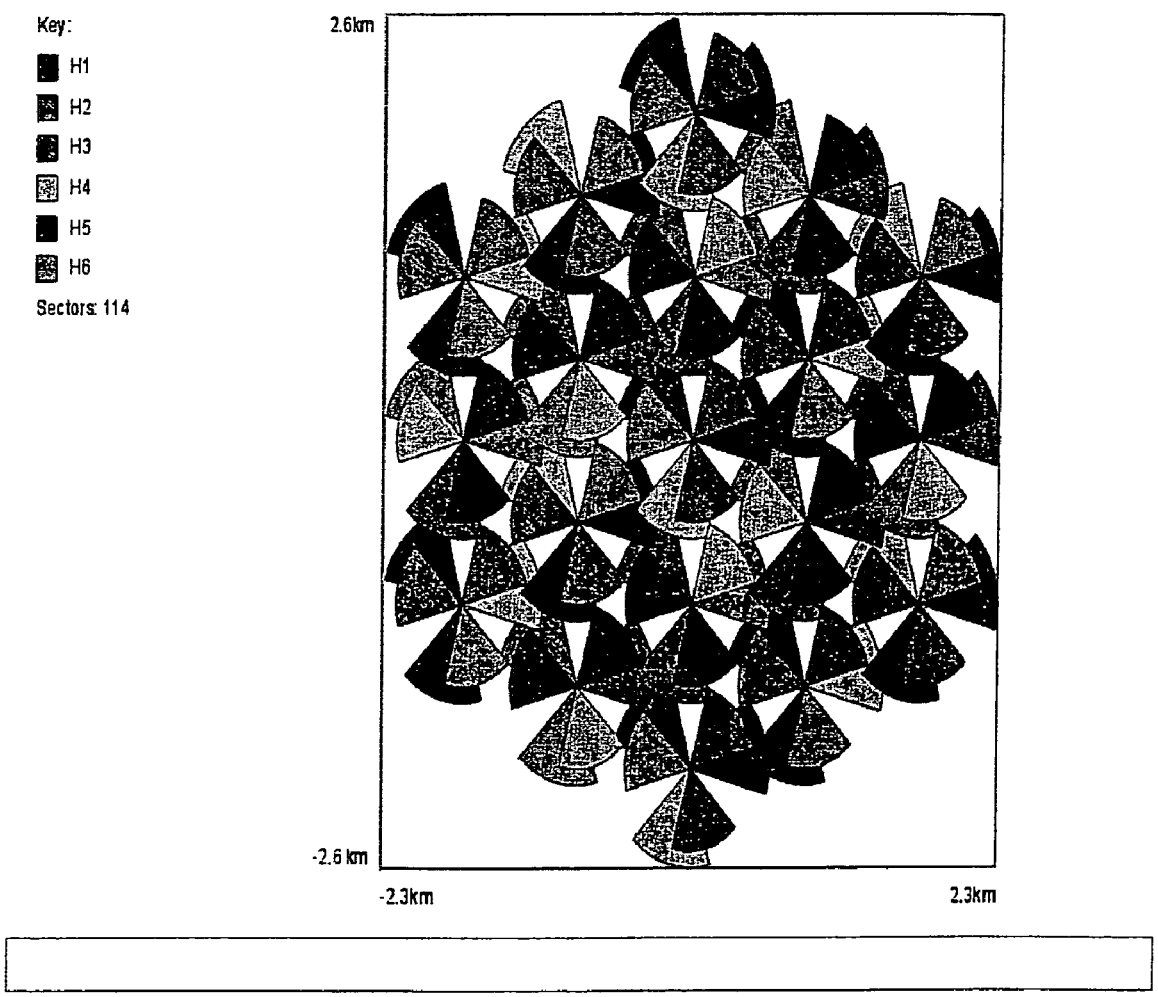
FIG 10 Second Hex Layer pattern

FIG 11 second hex outages
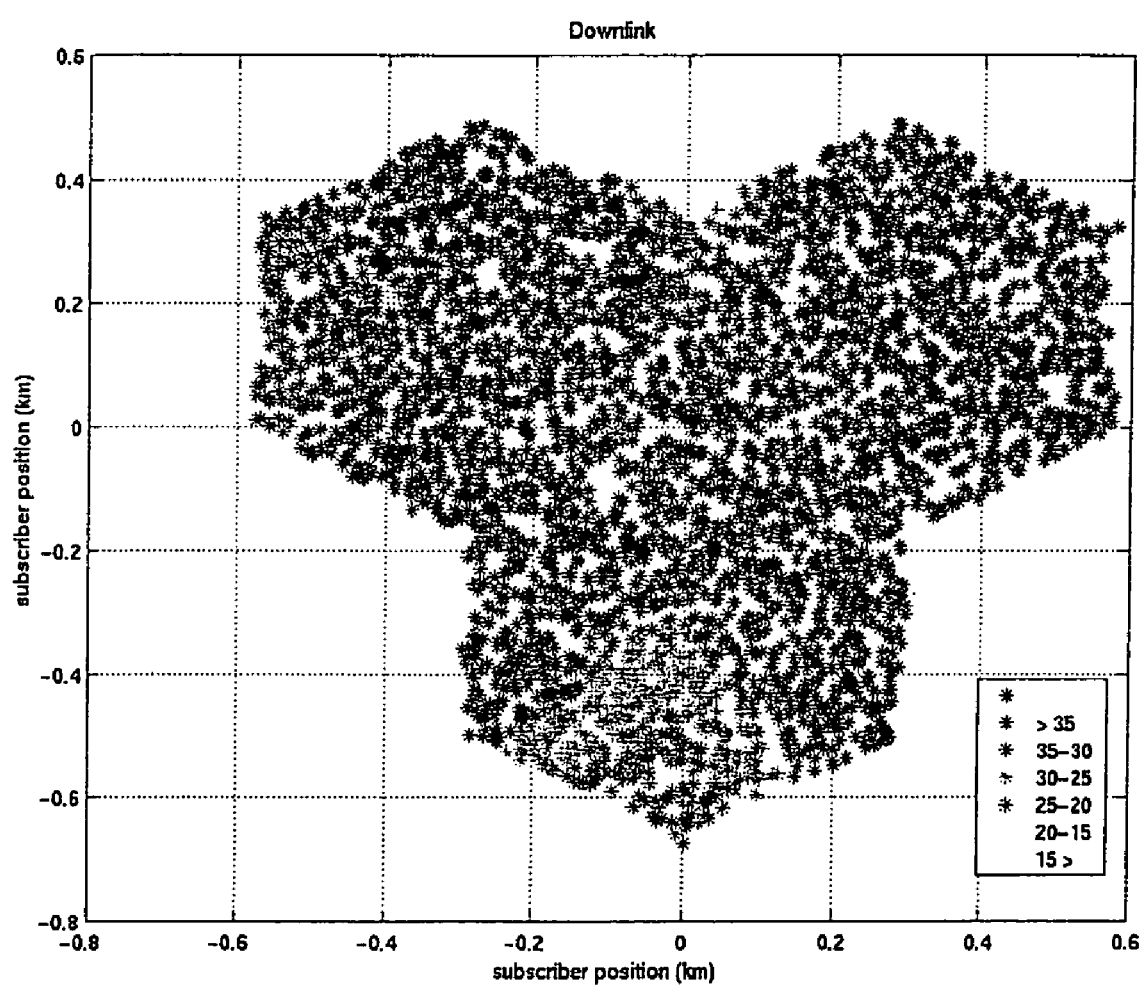

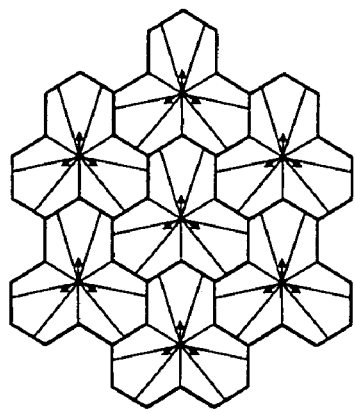
FIG 12 N=1/1
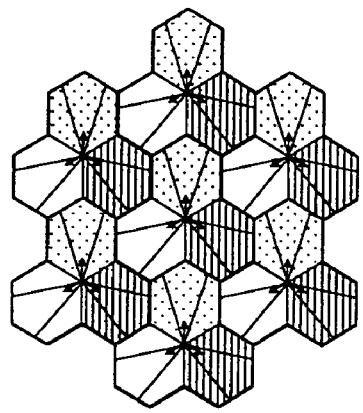
FIG 13 per sector reuse
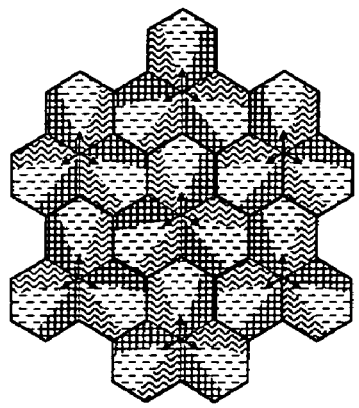
FIG 14 per beam reuse (alternating)
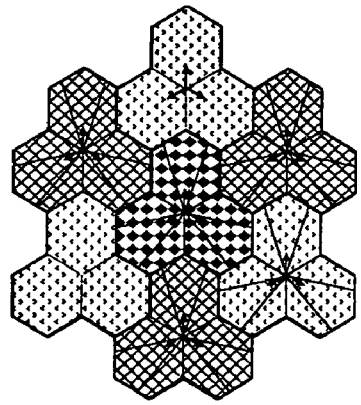
FIG 15 base reuse
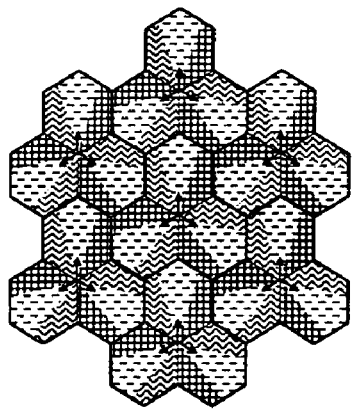
FIG 16 per beam reuse
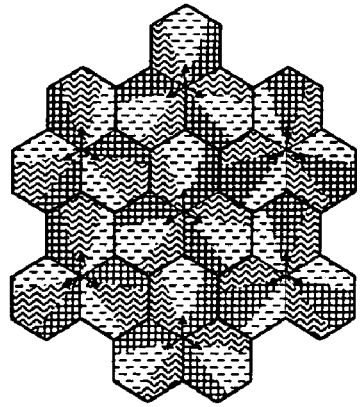
FIG 17 per beam reuse (rotated)

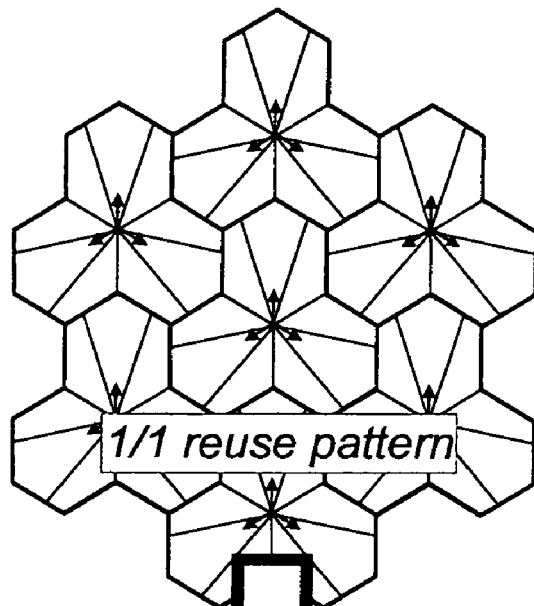
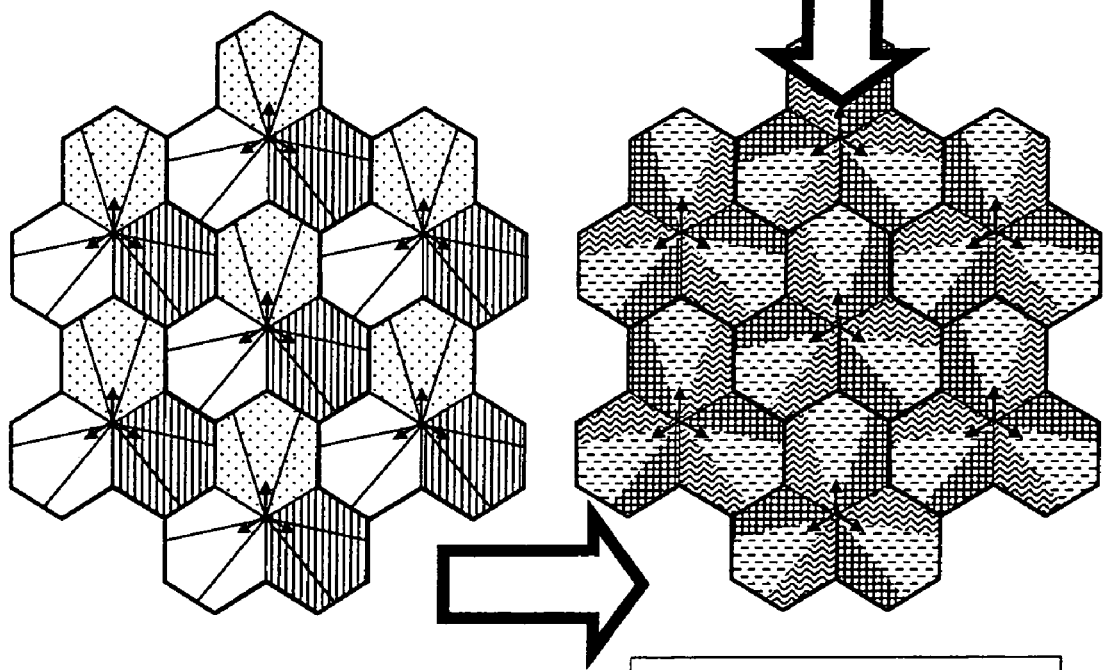
FIG 18 combination of 1/1 and two complementary 1/3 reuse patterns

MULTIPLE REUSE PATTERNS FOR CHANNELS OF WIRELESS NETWORKS

FIELD OF THE INVENTION

This invention relates to base stations for wireless networks having multiple reuse patterns of channels, to networks having such base stations, to allocators for such networks, to methods of allocating channels to users, and to methods of offering a transmission service over such networks.

BACKGROUND TO THE INVENTION

Cellular communications networks are well known for both mobile and fixed subscribers. In cellular networks the coverage area is divided into cells, each cell is served by a base station or base site which allocates a frequency or group of frequencies which define communication channels between the subscriber and base station. The number of frequencies available to a cellular network is limited; so the frequencies are re-used over different cells to make maximum use of these frequencies while at the same time maintaining an acceptable level of interference between neighboring cells operating on the same frequency. Cells can be divided into sectors, each sector being allocated a particular frequency or group of frequencies, with reuse of the frequencies. In some conventional mobile subscriber sectored networks, frequencies are allocated such that the same frequency is given to corresponding similarly aligned sectors in each base site. While this reduces the level of interference from adjacent (first pattern repeat) cells, inference still occurs with cells beyond the adjacent cell-second, third pattern repeat and so on interference. Such arrangements are a particular problem in FWA (fixed wireless access) networks where subscribers have high gain narrow beamed directional antennas, because the directional antenna is still aligned with co-frequency sectors in adjacent (first pattern repeat) and more distant (second, third . . . pattern repeat) cells.

There have been attempts to reduce co-frequency interference by varying the direction of sectors in some cells with respect to other cells such that sectors having the same frequency or frequency group are mis-aligned. By rotation of some cell sectors with respect to other cell sectors, direct co-frequency interference from first pattern repeat cells can be reduced.

It has also been known to change the polarization of two adjacent co-channel sectors on an ad hoc basis to overcome severe and localised cases of co-channel interference.

Another method of reducing interference is to increase the number of frequencies or frequency groups allocated to each cell by increasing the number of sectors. In this way each sector is narrower and will therefore be less exposed to co-frequency sectors of adjacent cells, and for directional subscribers with suitable sector rotation the cell distance between direct interfering sectors can be increased. The number of frequencies or frequency groups allocated to each cell is known as the frequency reuse factor N which is a product of the base re-use factor $N_b$ and the sector re-use $N_s$. The frequency re-use factor in GSM type mobile systems is typically 12–48. Generally the higher the frequency re-use factor N, the lower the co-frequency interference and hence the better the carrier to interference ratio (C/I). However the high frequency re-use factors typical in mobile systems reduces the capacity of the system in that less frequencies are available per base.

Most prior art systems are concerned with serving subscribers who are equipped with omnidirectional antennas such as mobile phones, which receive signals equally from all directions. The allocation of frequencies to base stations in these systems is therefore typically restricted to prevent strong unwanted interfering signals from first pattern repeat cells. For directional receivers as used typically in FWA systems and some mobile applications, different reuse patterns may be more effective, exploiting the fact that sectors can reuse frequencies with less spatial separation provided they are not facing the directional receivers of other sectors, in other words if there is directional misalignment. One known arrangement shown in U.S. Pat. No. 6,405,044 involves maintaining directional mis-alignment and polarization differences across the network between sectors carrying common frequencies in order to reduce co-frequency interference.

Another known arrangement involves using a number of different reuse patterns for different channels. This is called a tiered approach. Some channels are arranged in a first tier which uses an aggressive reuse pattern with a low reuse factor N, to achieve high capacity at the expense of poor CDF (coverage distribution function) profile. To enhance the C/I for the areas of poor coverage, the remaining channels are in a second tier with a reuse pattern with a higher reuse factor N, which has better CDF profile, but at the expense of capacity. When a base station allocates a channel to a user, it tries to allocate a channel in the first tier, but if the C/I is too low, it may move the user to a channel in the second tier. Such tiering is known for "threshold" type second generation 2G cellular networks where a minimum C/I is needed to initiate a link at all.

A different approach proposed as an evolution of 3G networks, can use adaptive modulation and coding (AMC) of the channels to provide higher data rates over some areas having a higher C/I, though when there are users in the areas of weaker signal strength, there will be a lower data rate available.

SUMMARY OF THE INVENTION

It is an object of the present invention to provide improved apparatus and methods. According to a first aspect of the present invention, there is provided a base station for a wireless network having multiple channels for communicating between the base station and user equipments UE, some of the channels having a first channel reuse pattern, others having a second channel reuse pattern, the base station having an allocator arranged to allocate a channel from one of the patterns for communication with a given user equipment, the patterns being complementary such that areas of low carrier to interference ratio C/I of the first channel reuse pattern are not coincident with areas of low C/I of the second channel reuse pattern, the allocator being arranged such that for user equipment located in an area of low C/I of any of the complementary patterns, the allocator favors allocation of a channel of another of the complementary patterns.

Compared to the prior tiered reuse patterns, making the reuse patterns complementary, can enable the allocator to avoid allocating channels having low C/I while limiting or avoiding the consequential reduction in overall capacity or in coverage in the sense of spatial availability of a level of service such as data rate. It is based on an appreciation that the prior tiered approach sacrifices a lot of capacity to deal with the areas of low C/I, which form the "tail" of the C/I distribution (CDF) of the aggressive reuse pattern. The need for a large fade margin to provide for worst case conditions might require a low capacity reuse scheme such as one of order 3,9 (meaning base reuse factor 3 and sector reuse factor 3, and thus channel reuse factor of 9) with polarization reuse. The sacrifice of capacity can be reduced or the compromise improved by using complementary patterns, because the users lying in the tail of one pattern do not lie in the tail of the other pattern, so there is less need or no need for the capacity-hungry high re-use factor pattern.

The patterns can be varied in many ways to make them complementary, including using different rotational groups, (more appropriate to directional transceivers, where sector rotation can be used to affect C/I) or different sector reuse or base reuse (more appropriate for omnidirectional transceivers). The channels may be of any type, currently the common types are frequencies, time slots or CDMA codes. The reuse patterns can be of any type including reuse on selected base stations, or on selected sectors, or different polarizations, or combinations of these or other parameters for example. The network can be of any type including fixed wireless access FWA, or mobile networks. The advantages still apply but to a lesser extent if some but not all low C/I areas are not coincident. The communication can be any sort of information including data, voice, or multimedia information for example. The network can be a "fat pipe" network in which many or all the channels can temporarily be allocated to a single user to give the appearance of a broadband service network.

An additional feature of some embodiments is the first and second channel reuse patterns having similar reuse factors. By having less difference in reuse factor between the complementary reuse patterns, the capacity can be maximized more easily. An additional feature of some embodiments is the channels being any of frequencies, time slots, or CDMA codes.

An additional feature of some embodiments is the complementary patterns having a reuse factor of 6. This suits a conventional hexagon based layout of base stations and is particularly suitable for links to user equipment having directional antennas.

An additional feature of some embodiments is one or more further reuse patterns, including a third pattern having a higher reuse factor than the complementary patterns. This uses some tiering as well to enable more even spatial coverage at the expense of some overall capacity. Again it is particularly suitable for downlinks to user equipment having directional reception. An additional feature of some embodiments is the third pattern having a reuse factor of 9.

An additional feature of some embodiments is one or more further reuse patterns, including one or more having a lower reuse factor than the complementary patterns. In this case tiering is used as well, but the complementary patterns can be used for dealing with the "tail" of the lower reuse factor pattern, with less sacrifice of capacity. Another alternative is to use complementary patterns at more than one level of the tiering.

An additional feature of some embodiments is an adaptor for adapting a modulation and coding of the channels to alter a data rate. This helps provide more even spatial coverage at higher data rates than AMC systems with a single reuse pattern.

An additional feature of some embodiments is the first and second channel reuse patterns having a similar reuse factor, and a third channel reuse pattern having a lower reuse factor. This is particularly suitable for downlinks to user equipment having omnidirectional reception, such as hand-held mobile terminals.

An additional feature of some embodiments is the first and second channel reuse patterns having a channel reuse factor of 3, the third channel reuse pattern having a channel reuse factor of 1.

In principle the allocation can be made elsewhere than the base station, e.g. more centrally, or at the user equipment, especially for uplinks, and corresponding advantages to those set out above apply. Also, the allocator can be a separately tradeable component or piece of software for upgrading existing equipment in the field. Hence another aspect provides a corresponding channel allocator for a wireless network having a number of base stations, multiple channels for communicating between base stations and user equipments, some of the channels having a first channel reuse pattern, others having a second channel reuse pattern, the allocator being arranged to allocate a channel from either pattern to communicate with a given user equipment, the patterns being complementary such that areas of low carrier to interference ratio C/I of the first channel reuse pattern are not coincident with areas of low C/I of the second channel reuse pattern, and the allocator being arranged such that for user equipment located in an area of low C/I of any of the complementary patterns, the allocator favors allocation of a channel of another of the complementary patterns.

As the benefit can be at the level of the network, and as the network may be much more valuable than its constituents, or in case some of the constituents are outside the territorial jurisdiction, a corresponding network and method of operating a network are claimed explicitly, the wireless network having a number of base stations, and multiple channels for communicating between base stations and user equipments, some of the channels having a first channel reuse pattern, others having a second channel reuse pattern, the network having an allocator arranged to allocate a channel from either pattern to communicate with a given user equipment, the patterns being complementary such that areas of low carrier to interference ratio C/I of the first channel reuse pattern are not coincident with areas of low C/I of the second channel reuse pattern.

An additional feature of some embodiments is the allocator being arranged such that for user equipment located in an area of low C/I of any of the complementary patterns, the allocator favors allocation of a channel of another of the complementary patterns.

The method is a method of operating a wireless network to offer a communication service, the wireless network having a number of base stations, and multiple channels for communicating between base stations and user equipments, some of the channels having a first channel reuse pattern, others having a second channel reuse pattern, the method having the step of:

allocating a channel from either pattern to communicate with a given user equipment, the patterns being complementary such that areas of low carrier to interference ratio C/I of the first channel reuse pattern are not coincident with areas of low C/I of the second channel reuse pattern.

According to second aspect there is provided a base station for a wireless network having multiple channels for communicating between the base station and user equipments UE, some of the channels having a first channel reuse pattern, others having a second channel reuse pattern, the base station having an allocator arranged to allocate a channel from any of the patterns to communicate with a given user equipment, and an adaptor for adapting a modulation or coding of the channels to alter a data rate. This combination of multiple patterns and AMC is notable for enabling a better compromise between overall capacity and spatial coverage with high data rates.

An additional feature of some embodiments is the first and a second patterns being complementary such that areas of low carrier to interference ratio C/I of the first complementary channel reuse pattern are not coincident with areas of low C/I of the second complementary channel reuse pattern, the allocator being arranged such that for user equipment located in an area of low C/I of any of the complementary patterns, the allocator favors allocation of a channel of another of the complementary patterns.

An additional feature of some embodiments is the patterns being arranged for use with user equipments having directional receivers. This can alter the C/I ratios radically. Even mobile or nomadic users can have directional receivers, having either manual or automated control of orientation.

An additional feature of some embodiments is the patterns having different reuse factors. This combination of Bering and AMC is also notable for enabling a better compromise between overall capacity and spatial coverage with high data rates A third aspect of the invention provides a wireless network having multiple channels for communicating between a base station and user equipments, some of the channels having a first channel reuse pattern, others having a second channel reuse pattern, the network having:

an allocator arranged to allocate a channel from either pattern to communicate with a given user equipment, and at least some of the user equipments having a directional transceiver. This combination of multiple patterns and directional transceivers can enable a better compromise between coverage and overall capacity.

An additional feature of some embodiments is an adaptor for adapting a modulation of the channels to alter a data rate.

An additional feature of some embodiments is the first and a second channel reuse patterns having different channel reuse factors.

The software for implementing the allocator is intended to encompass software, which runs on or controls "dumb" or standard hardware, to carry out the desired functions, (and therefore the software essentially defines the functions of the allocator and can therefore be termed an allocator even before it is combined with its standard hardware). For similar reasons, it is also intended to encompass software which describes or defines the configuration of hardware, such as HDL (hardware description language) software, as is used for designing silicon chips, or for configuring universal programmable chips, to carry out desired functions.

The advantages of the invention can enable improvements to be made in the system or network performance such as being more reliable or more flexible, having a greater capacity, or being more cost effective. Consequently data transmission services over the network can be enhanced, and the value of such services can increase. Such increased value over the life of the system, could prove far greater than the sales value of the equipment.

Any of the features can be combined with any of the aspects of the invention as would be apparent to those skilled in the art. Other advantages will be apparent to those skilled in the art.

BRIEF DESCRIPTION OF THE DRAWINGS

To show by way of example how the invention can be implemented, embodiments will now be described with reference to the figures in which:

FIG. 4 shows a typical CDF for prior art tiered patterns, FIG. 5 shows a typical CDF for complementary patterns, FIG. 6 shows a trilayer reuse pattern, FIG. 7 shows the trilayer outages, FIG. 8 shows a first hex pattern, FIG. 9 shows outages for the first hex pattern, FIG. 10 shows a second hex layer pattern, FIG. 11 shows second hex outages, FIGS. 12 to 17 show various reuse patterns, FIG. 18 shows a combination of complementary 1/3 sector reuse patterns and a 1/1 reuse pattern

DETAILED DESCRIPTION OF PREFERRED EMBODIMENTS

Figure 1:
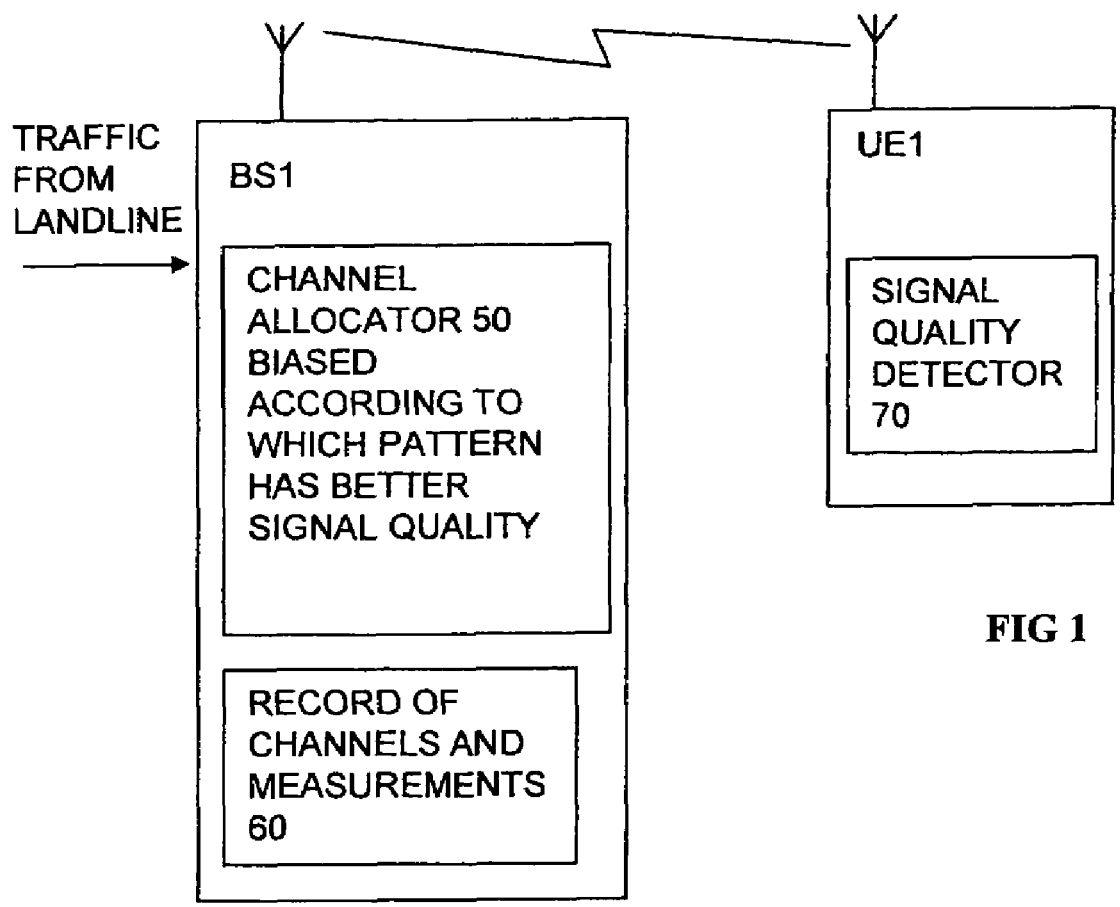
FIG. 1 shows in schematic form a wireless network according to an embodiment of the invention.

FIG. 1. Elements of a Wireless Network

In FIG. 1, elements of a wireless network are shown. A base station BS1 and a user equipment UE1 are shown coupled by a number of wireless channels. There may be many base stations and many user equipments. For the sake of clarity only selected parts of the elements are illustrated. The base station includes channel allocator 50 for allocating particular traffic channels to each of the UEs. The operation of the base station is explained in more detail with reference to FIGS. 2 and 3 below. The wireless channels typically include pilot channels for use in measuring signal quality, management channels for exchanging information about the allocations, and other management information. Most of the band width is used by traffic channels. These can be frequencies, time slots or CDMA codes following established principles. The traffic channels have reuse patterns by sector or base station as will be explained below with reference to FIGS. 6 to 19. The channel allocator is biased according to which pattern has a better measured signal quality for a given UE. The measurements of downlink signal quality are made by a signal quality detector 70 in the UE and the information is fed back to the base station over the management channel. The base station maintains a record 60 of channels, measurements and allocations. The downlink channel allocation is usually more difficult or critical than the uplink channel allocation. The uplink channel allocation can either follow the allocation made for the downlink, or be allocated independently.

Once the allocation has been made, the traffic for the downlink can flow from the base station to the UE. The traffic may be fed to the base station from other networks over land lines following conventional practice. The network can be a fixed wireless access, or a mobile network for example. How the reuse of channels is arranged is one of the critical limits on the overall capacity of the network and is therefore commercially significant. As the signal quality for a given channel will vary significantly in different locations, the allocation of the available channels to UEs at different locations should be optimized to make best use of the available capacity, and ensure even spatial distribution of available capacity.

Figure 2:
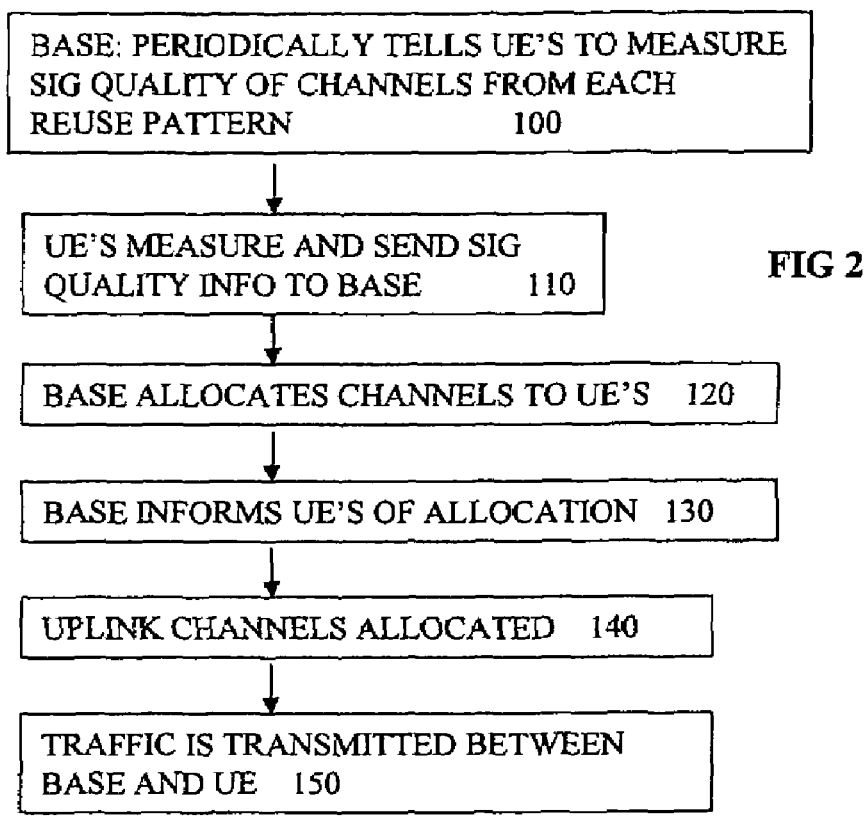
FIGS. 2 and 3 show operation of a base station according to an embodiment.
Figure 3:
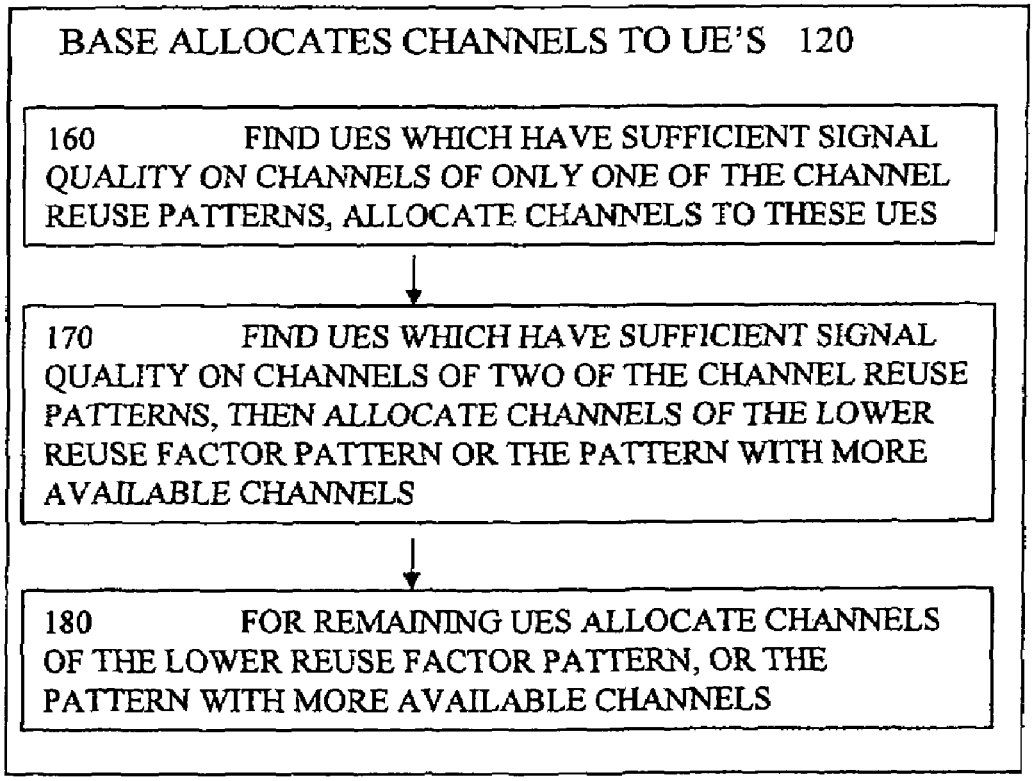

FIGS. 2 and 3, Operation of the Base Station

FIG. 2 shows some of the principal steps involved in the channel allocation process. This may take place periodically, to optimize existing channel allocations, or only when a new channel needs to be allocated, in response to a user request. At step 100 the base station periodically instructs the UEs to measure signal quality of channels from each reuse pattern. At step 110 the UEs measure and send signal quality information to the base. At step 120 the base allocates channels to the UEs. At step 130 the base informs UEs of this allocation. At step 140 the uplink channels are allocated. At step 150 the traffic is transmitted between the base and the UE.

FIG. 3 shows in more detail an example of the steps involved in allocating the channels to the UEs. At step 160 it finds the UEs which have sufficient signal quality on channels of only one of the channel reuse patterns, and allocates channels to the UEs. At step 170 the base station finds UEs which have sufficient signal quality on channels of two of the channel reuse patterns, then allocates channels of the lower reuse factor pattern (to improve overall capacity) or the pattern with more available channels. Of course there may be three or more channel reuse patterns if desired. Finally at step 180, for remaining UEs, channels of the pattern having more available channels, or channels of the lower reuse factor pattern are allocated.

FIGS. 4 and 5, CDF Graphs

FIG. 4 shows a C/I CDF (Cumulative Distribution Function) for the above mentioned prior art tiered pattern reuse scheme with thresholding. This is essentially an integral from minus infinity to the value on the x axis of the corresponding PDF (probability distribution function). On the x-axis the signal quality in the form of C/I (carrier to interference ratio) value is represented, typically as a dB value. The y-axis represents the probability of receiving at or below that given C/I value at any location. One curve shows the CDF for a low reuse factor pattern, the other curve, shifted to the right, is the CDF for a higher reuse factor pattern (implying a less aggressive reuse and thus lower overall capacity). There is a threshold indicated by a dotted line which is the minimum C/I value to establish a working channel. For the low reuse factor pattern there is a small tail representing locations having poor signal quality, below the threshold. To enable UEs at these locations to establish communication, the base station must allocate channels in the high reuse factor pattern where the C/I value will be higher. The size of the tail reflects the areas of the cell or sector subject to outage and thus loss of service as a proportion of the size of the cell or sector.

FIG. 5 shows a CDF for a complementary reuse pattern according to an embodiment of the invention. As before, there are two curves, one for each pattern. Again, UEs in the tail of one of the patterns, should be allocated a channel from the complementary pattern. In this case, the patterns are complementary such that areas of low C/I (tail) of one pattern are not spatially coincident with areas of low C/I (tail) of the other complementary pattern, as will be explained. This means inevitably the UEs located in the tail of one pattern will not be in the tail of the other. Thus the tail can be dealt without the need for a higher reuse factor pattern or with less need for a higher reuse factor pattern, and thus the loss of overall capacity associated with the higher reuse pattern can be avoided or reduced.

FIGS. 6 and 7, Tri Layer Channel Reuse Pattern,

FIG. 6 shows a tri layer channel reuse pattern, for use in embodiments of the invention, in this case for frequency reuse, but applicable to other types of channels. The base stations are arranged in a hexagonal pattern. Three sectors are shown for each base station. 9 different frequencies or groups of frequencies are used, each represented by numbers 23–31 and different shading. The size of the pattern is such as to cover several tens of square kilometers. The channel reuse factor is 9, as there is base reuse of order 3, and sector reuse of order 3. In addition there is polarization reuse, since vertical and horizontal polarizations are used alternately, marked as V and H. Furthermore there is sector rotation so that for the next identical base in the pattern, there is a rotation of the sectors, which only repeats every third base. FIG. 7 shows a map of signal quality in terms of C/I at different positions, lower C/I being shown as lighter shaded marks. Note areas of low C/I are located predominantly near the bottom of the pattern. This enables other patterns to be complementary if they have low C/I at other areas.

FIGS. 8, 9 First Hex Channel Reuse Pattern

FIG. 8 shows a first hex channel reuse pattern having six frequencies or groups of frequencies labeled numbers 9–14. This has a channel reuse factor of 6, since all bases use all 6 frequencies, on 6 sectors. Again there is sector rotation. The corresponding map of signal quality in FIG. 9 shows how there are areas of low C/I at the sides. Thus this is complementary to the pattern of FIGS. 6 and 7.

FIGS. 10, 11 Second Hex Channel Reuse Pattern

FIG. 10 shows a second hex channel reuse pattern, again having six frequencies or groups of frequencies labeled H1–H6. This has a channel reuse factor of 6, since all bases use all 6 frequencies, on 6 sectors. Again there is sector rotation. The corresponding map of signal quality in FIG. 11 shows how there are areas of low C/I at the bottom, and hence this pattern can be complementary to that of FIGS. 8 and 9.

Two notable combination of patterns are a) two complementary patterns of order 1,6, e.g. the patterns of FIGS. 8 and 10, for use with directional transceivers and b) the same with some additional channels using the pattern of FIG. 6, having order 3,9, to give a complementary and tiered combination, again for use with directional transceivers.

FIGS. 12 to 18 Channel Reuse Patterns for Base Stations with Three Sectors and Each Sector Having Three Beams FIGS. 12–18 all show channel reuse patterns for base stations with three sectors and each sector having three beams. This is equivalent to 9 sectors per base. FIG. 12 shows an arrangement having a channel reuse factor of 1. All three beams in each sector have the same channels. FIGS. 13–17 show various alternative reuse patterns with a channel reuse factor of 3. Having several different beams for each sector gives more different reuse patterns. FIGS. 12, 13 and 15 can be applied to 3- or to 9-sectored arrangements. FIGS. 14, 16, and 17 are specific to 3 beams per sector. FIGS. 13 and 15 are straightforward extensions of FIG. 12 to shift the COF to the right by introducing a sector or base reuse of 3. FIGS. 13 and 15 have similar CDF profiles but are complementary.

FIG. 16 introduces per beam reuse, in a straightforward way and can achieve a different distribution of areas of low C/I. FIG. 17 introduces rotation of the beam reuse at different bases to give a different distribution. FIG. 14 achieves yet another distribution of the locations of the outages by alternating the directions of the rotations of the beam reuse, clockwise or anti clockwise in different columns of the bases. In each case the locations of the outages are different and so the patterns can be complementary. Many different combinations of these complementary patterns can be made.

FIG. 18 shows a particular combination of patterns, from FIGS. 12, 13, and 14. There are 2 complementary patterns having a channel reuse factor of 3, together with a pattern having a channel reuse factor of 1. Most of the channels would typically have the channel reuse pattern of factor 1. The remaining channels would have the less aggressive complementary reuse patterns. Other combinations of complementary patterns such as those in FIGS. 12–17 can be conceived. These patterns can be used with omnidirectional or directional transceivers.

Figure 19:
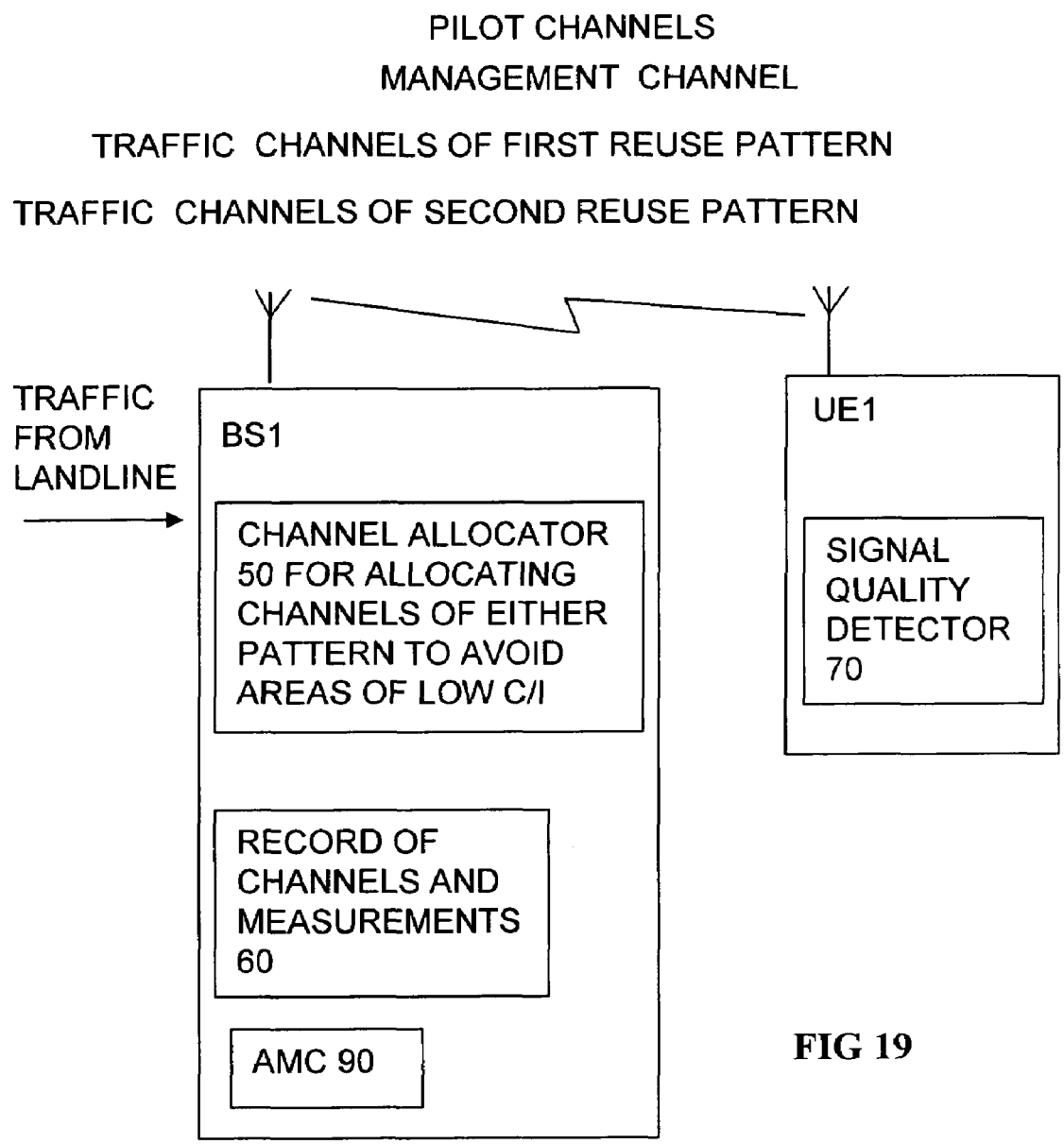
FIG. 19 shows elements of a wireless network having multiple reuse patterns and using AMC.

FIG. 19, Elements of a Wireless Network Having Multiple Reuse Patterns and Using AMC FIG. 19 shows similar elements to those shown in FIG. 1, and corresponding references numerals have been used where appropriate. The notable differences will now be explained. The traffic channels can be in multiple patterns. The patterns can be tiered or not, or complementary or not or be a combination for example. The channel allocator 50 is for allocating channels from either pattern to avoid areas of low C/I while trying to optimize overall capacity. The base station includes an adaptor 90 for adapting the modulation and/or coding of each channel. This effectively provides a variable data rate to suit the signal quality. In association with the use of multiple reuse patterns, it enables the tail to be dealt with more effectively. The use of two mechanisms with different ways of dealing with C/I which have different side effects, means a better compromise between conflicting requirements can be achieved. The reduction in capacity associated with tiering can be reduced by using AMC. AMC does not on its own deal effectively with areas of low C/I. Introducing complementary reuse patterns can improve this further by reducing the capacity reduction implied by tiering.

Figure 20:
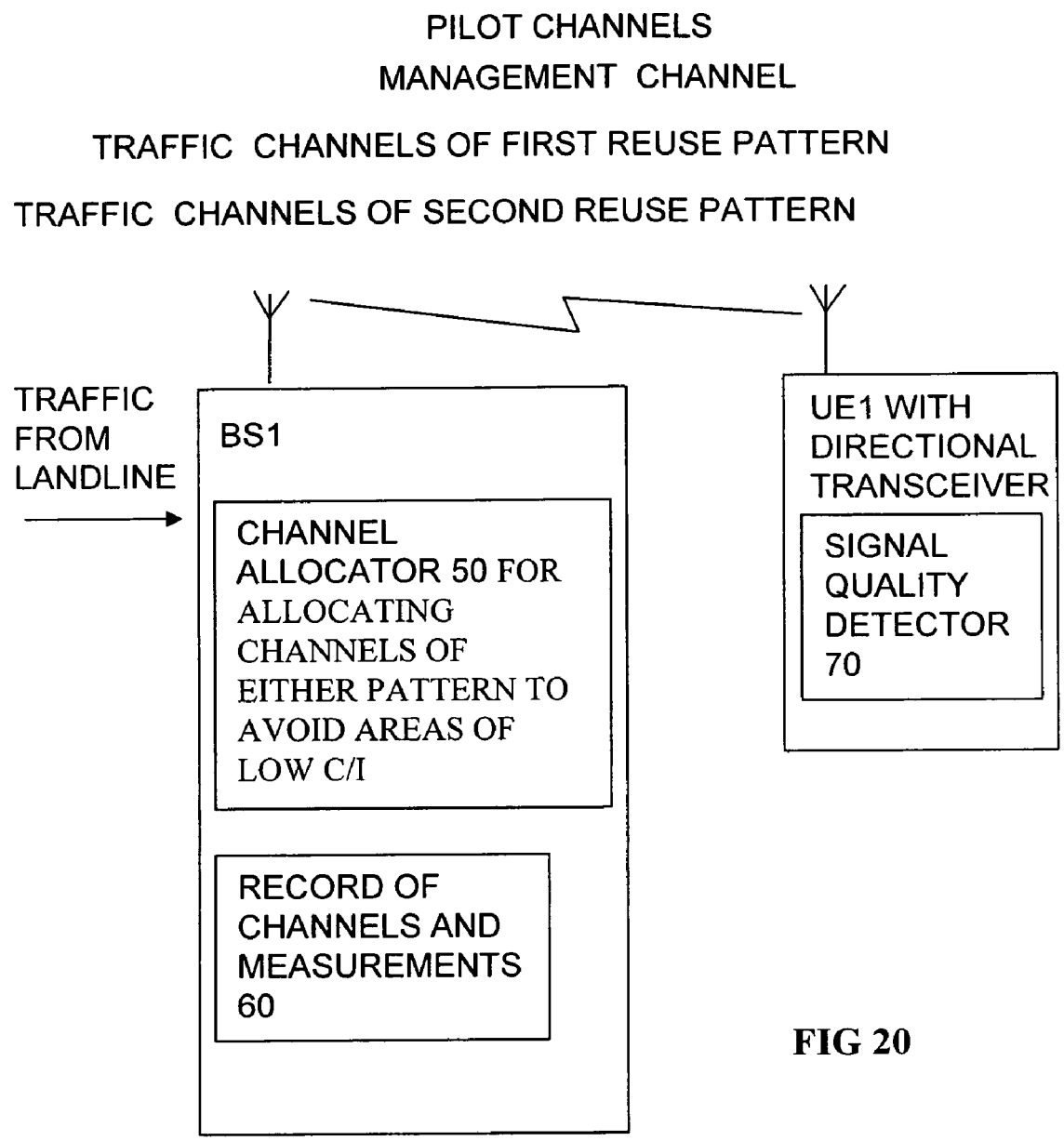
FIG. 20 shows elements of a wireless network having multiple reuse patterns and using directional transceivers.

FIG. 20, Elements of a Wireless Network having Multiple Reuse Patterns and Directional Transceivers In FIG. 20, elements of a wireless network having multiple reuse patterns and directional receivers are shown. Again it shows similar elements to those shown in FIG. 1, and corresponding references numerals have been used where appropriate. In this case there is not necessarily any AMC. The UE has a directional transceiver. The traffic channels can be in multiple patterns. The patterns can be tiered or not, or complementary or not or be a combination for example. The channel allocator 50 is for allocating channels from either pattern to avoid areas of low C/I while trying to optimize overall capacity. The use of directional transceivers combines effectively with multiple reuse patterns to enable areas of low C/I to be minimized and distributed so as to enable capacity reduction to be reduced.

Concluding Remarks

As has been described above, a base station for a wireless network has multiple channels for communicating with user equipments, and has multiple channel reuse patterns. The patterns are complementary such that areas of low carrier to interference ratio C/I of one pattern are not coincident with areas of low C/I of other patterns. An allocator allocates channels such that for user equipment located in an area of low C/I of any of the complementary patterns the allocator favors allocation of a channel of another of the complementary patterns. The sacrifice of capacity can be reduced as there is less need for a capacity-hungry high re-use factor pattern. The channels may be frequencies, time slots or CDMA codes. The reuse patterns can involve reuse on selected base stations, or on selected sectors, or different polarizations. The network can be of any type including fixed wireless access FWA, or mobile networks.

Other variations will be apparent to those skilled in the art, having corresponding advantages to those set out above, within the scope of the claims.

The invention claimed is:

1. A base station for a wireless network comprising:
multiple downlink channels for communicating between the base station and user equipments UE, some of the downlink channels having a first channel reuse pattern, others having a second channel reuse pattern, the first and second downlink channel reuse patterns having a same reuse factor,
an allocator arranged to allocate a downlink channel from one of the patterns for communication with a given user equipment, the patterns being complementary such that areas of low carrier to interference ratio C/I of the first downlink channel reuse pattern are not coincident with areas of low C/I of the second downlink channel reuse pattern,
wherein the allocator is arranged such that, for a user equipment located in an area of low C/I of any of the complementary downlink channel reuse patterns, the allocator favors allocation of a channel of another of the complementary downlink channel reuse patterns.

2. The base station of claim 1, wherein the downlink channels are any one of frequencies, time slots and CDMA codes.

3. The base station of claim 1, wherein the complementary downlink channel reuse patterns have a reuse factor of 6.

4. The base station of claim 1, further comprising a third downlink channel reuse pattern, said third downlink channel reuse pattern having a higher reuse factor than the complementary downlink channel reuse patterns.

5. The base station of claim 4, wherein the third pattern has a reuse factor of 9.

6. The base station of claim 1, further comprising a third downlink channel reuse pattern, said third downlink channel reuse pattern having a lower reuse factor than the complementary downlink channel reuse patterns.

7. The base station of claim 6, wherein the first and second downlink channel reuse patterns have a channel reuse factor of 3, the third channel reuse pattern having a channel reuse factor of 1.

8. The base station of claim 1, further comprising an adaptor for adapting a modulation and coding of the downlink channels to alter a data rate.

9. A channel allocator for a wireless network having a base station comprising multiple downlink channels for communicating between the base station and user equipments, some of the downlink channels having a first downlink channel reuse pattern, others having a second downlink channel reuse pattern, the first and second downlink channel reuse patterns having a same reuse factor,
wherein the allocator is arranged to allocate a downlink channel from either downlink channel reuse pattern to communicate with a given user equipment, the downlink channel reuse patterns being complementary such that areas of low carrier to interference ratio C/I of the first downlink channel reuse pattern are not coincident with areas of low C/I of the second downlink channel reuse pattern, and wherein the allocator is arranged such that, for a user equipment located in an area of low C/I of any of the complementary downlink channel reuse patterns, the allocator favors allocation of a downlink channel of another of the complementary downlink channel reuse patterns.

10. A wireless network having a base station comprising multiple downlink channels for communicating between said base stations and user equipments, some of the downlink channels having a first downlink channel reuse pattern, others having a second downlink channel reuse pattern, the first and second downlink channel reuse patterns having a same reuse factor, wherein the network has an allocator arranged to allocate a downlink channel from either downlink channel reuse pattern to communicate with a given user equipment, the downlink channel reuse patterns being complementary such that areas of low carrier to interference ratio C/I of the first downlink channel reuse pattern are not coincident with areas of low C/I of the second downlink channel reuse pattern.

11. The network of claim 10, wherein the allocator is arranged such that for a user equipment located in an area of low C/I of any of the complementary downlink channel reuse patterns, the allocator favors allocation of a downlink channel of another of the complementary downlink channel reuse patterns.

12. A method of operating a wireless network to offer a communication service, the wireless network having a base station comprising multiple downlink channels for communicating between said base stations and user equipments, some of the downlink channels having a first downlink channel reuse pattern, others having a second downlink channel reuse pattern, the first and second downlink channel reuse patterns having a same reuse factor, wherein the method comprises:

allocating a channel from either downlink channel reuse pattern to communicate with a given user equipment, the downlink channel reuse patterns being complementary such that areas of low carrier to interference ratio C/I of the first downlink channel reuse pattern are not coincident with areas of low C/I of the second downlink channel reuse pattern.

13. A base station for a wireless network comprising:

multiple downlink channels for communicating between the base station and user equipments UE, some of the downlink channels having a first downlink channel reuse pattern, others having a second downlink channel reuse pattern, the downlink channel reuse patterns being complementary such that areas of low carrier to interference ratio C/I of the first downlink channel reuse pattern are not coincident with areas of low C/I of the second downlink channel reuse pattern the first and second downlink channel reuse patterns having a same reuse factor; and an allocator arranged to allocate a channel from any of the downlink channel reuse patterns to communicate with a given user equipment, and an adaptor for adapting a modulation or coding of the downlink channels to alter a data rate.

14. The base station of claim 13, wherein the allocator is arranged such that for a user equipment located in an area of low C/I of any of the complementary downlink channel reuse patterns, the allocator favors allocation of a downlink channel of another of the complementary downlink channel reuse patterns.

15. The base station of claim 13, wherein the downlink channel reuse patterns are arranged for use with user equipments having directional receivers.

16. A wireless network comprising:

multiple downlink channels for communicating between a base station and user equipments, some of the downlink channels having a first downlink channel reuse pattern, others having a second downlink channel reuse pattern, the downlink channel reuse patterns being complementary such that areas of low carrier to interference ratio C/I of the first downlink channel reuse pattern are not coincident with areas of low C/I of the second downlink channel reuse pattern, the first and second downlink channel reuse patterns having a same reuse factor;

an allocator arranged to allocate a downlink channel from either downlink channel reuse pattern to communicate with a given user equipment, and at least some of the user equipments having a directional transceiver.

17. The network of claim 16, further comprising an adaptor for adapting a modulation of the downlink channels to alter a data rate.

* * * * *